Aug. 7, 1945.  G. N. PROCTOR  2,381,140
STORAGE BATTERY
Filed Dec. 27, 1941  2 Sheets-Sheet 1

Inventor
George N. Proctor
By Henry Lanahan
Attorney

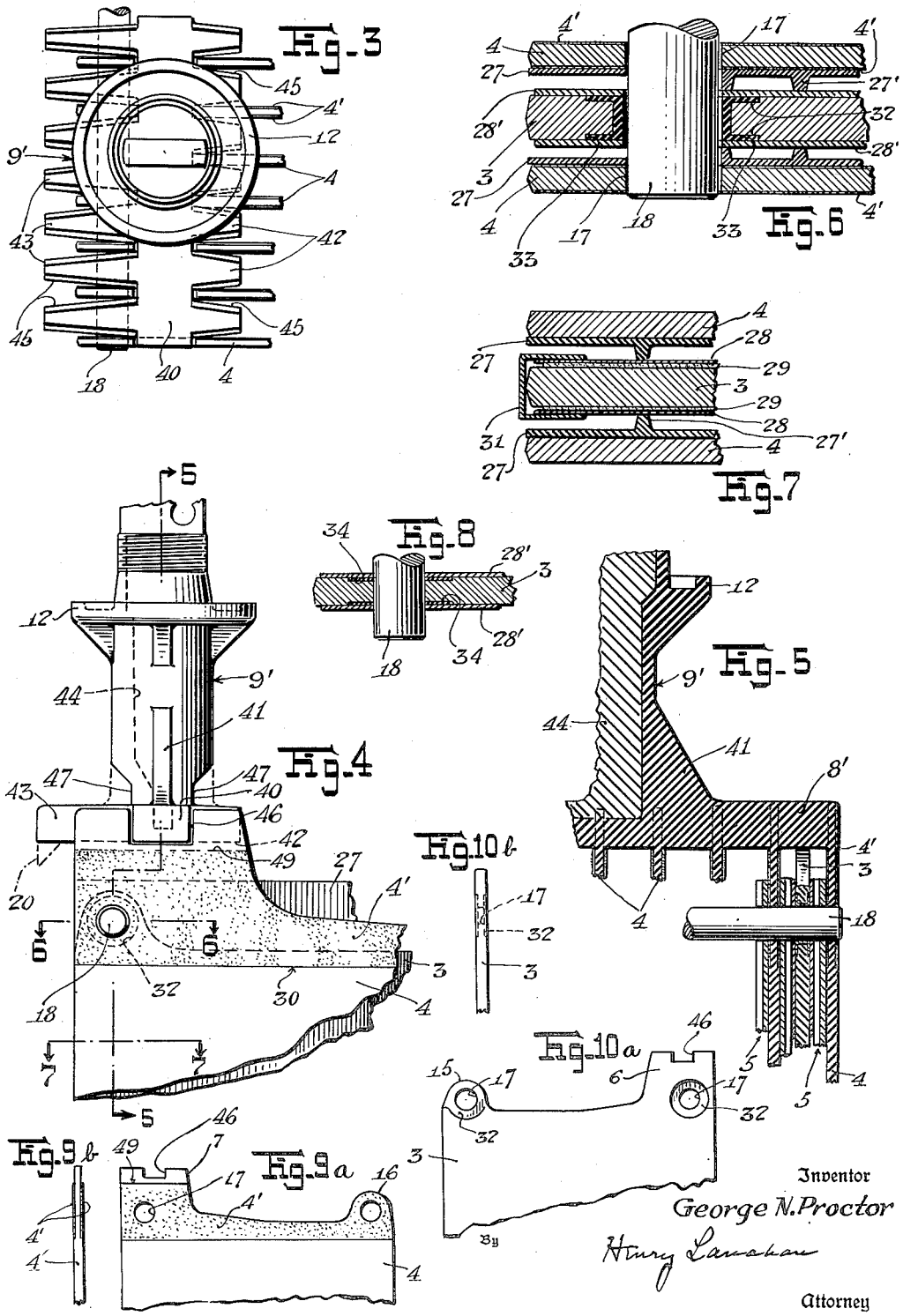

Patented Aug. 7, 1945

2,381,140

UNITED STATES PATENT OFFICE 2,381,140

STORAGE BATTERY

George N. Proctor, Verona, N. J., assignor to Thomas A. Edison, Incorporated, West Orange, N. J., a corporation of New Jersey Application December 27, 1941, Serial No. 424,632

1 Claim. (Cl. 136—134)

This invention relates to improvements in the construction and arrangement of storage batteries designed to facilitate the manufacture of the batteries and to render them more reliable and efficient. The invention relates particularly to storage batteries of the heavy-duty type such as are employed in submarines, trucks, etc.; however, no unnecessary limitation of my invention to such heavy-duty batteries is intended, as my invention may be also advantageously employed in smaller, more normal sized batteries.

Certain features disclosed herein are claimed in my pending continuation in part application Serial No. 518,483, filed January 14, 1944 and entitled Storage battery.

When storage batteries are made comparatively great in height and weight, there are encountered special manufacturing problems in constructing and assembling the parts, and in providing a compact battery plate and separator assembly having adequate insulation between the battery plates, these problems being particularly difficult in connection with the construction of batteries for submarines as here it is desired to obtain exceptional reliability and durability and the maximum capacity within a limited space. It is a general object of my invention to provide an improved construction and arrangement of a heavy-duty battery wherein these abovementioned difficulties are largely overcome.

A further object of my invention is to provide an improved terminal structure for a battery which may be readily manufactured and fused to a plurality of battery plates to provide a low resistance terminal for the plates having great strength and a large surface area for heat dissipation.

It is yet a further object to attain the above-stated ends while to render the battery easier to service and to maintain in operating condition.

Still other objects of my invention will more fully appear from the following description and the appended claim.

In the description of my invention reference is had to the accompanying drawings of which:

Figure 3 is a horizontal plan view of the terminal post of my invention as it appears before being fused to the battery plates.

Figure 4 is a fractional side elevational view of the terminal post and battery plates in assembled relation as they appear before being fused together, a contour of the post after fusing being indicated by dash-dot lines;

Figure 5 is a fractional sectional view, to enlarged scale, taken substantially on the line 5—5 of Figure 4;

Figure 6 is an enlarged fractional horizontal section taken substantially on the line 6—6 of Figure 4;

Figure 7 is an enlarged fractional horizontal section taken substantially on the line 7—7 of Figure 4;

Figure 8 is a view, similar to Figure 6, showing an alternative arrangement of one aspect of my invention;

Figures 9a and 9b are respectively side and end elevations of the upper part of the negative plate according to my invention; and Figures 10a and 10b are respectively side and end elevations of the upper part of the positive plate according to my invention.

Figures 1, 2:
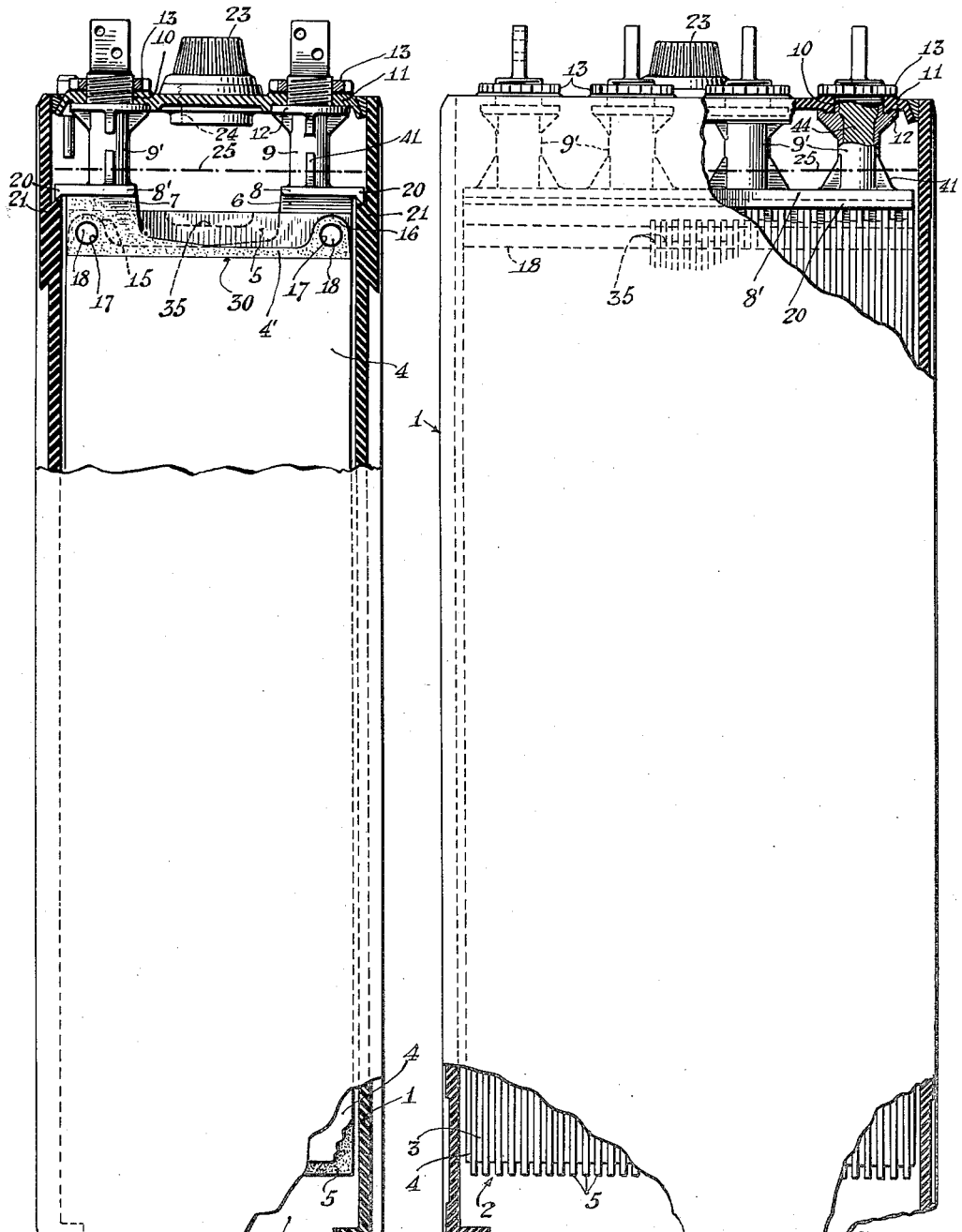
Figure 1 is an end view, partly in vertical section and partly in elevation, of a storage battery to which my invention is applied.
Figure 2 is a side view, partly in vertical section and partly in elevation, of the storage battery shown in Figure 1.

The storage battery shown in the accompanying figures comprises an outer case 1 within which there is mounted a stack or assembly 2 of alternate positive and negative plates 3 and 4 and intervening separator groups 5. The plates 3 and 4 are provided with upstanding positive and negative connecting lugs 6 and 7 respectively. These lugs are welded or fused to positive and negative straps 8 and 8' which are respectively integral with terminal posts 9 and 9', the terminal posts and straps being identical in shape but distinguished here with respect to their polarity by the use of prime notation. The conducting lugs 6 and 7 project upwardly from one of the upper corners of each plate to the corresponding strap. At the opposite corners of the positive and negative plates there are provided upstanding ears 15 and 16. These lugs and ears have apertures 17 therein. In the assembly 2, the positive and negative plates are arranged alternately with their conducting lugs at opposite sides of the battery, and a rod 18 is passed through the apertures in each set of conducting lugs of like polarity and corresponding ears of opposite polarity and through apertures in the intervening separator groups 5. The rods 18 thus serve to rigidify the assembly and to hold it into a unitary structure, this being quite necessary in large sized batteries.

The assembly 2 is carried in the case 1 by lateral projections 20 provided on the straps 8 and 9 which rest on horizontal ledges 21 provided on the inner walls of the case 1 near the top thereof, the assembly being supported above the bottom of the case to leave a free space 22 in the case below the assembly for the collection of sediment, as appears in Figures 1 and 2. The terminal posts extend up through openings 10 provided in a cover 11 of the case 1, these posts having shoulders 12 and seal nuts 13 thereon between which the cover is clamped. On the top cover 11 there is a cap 23 detachable to expose a filler opening 24. Through this opening the battery is filled with electrolyte typically to the level indicated by the dash-dot line 25. Ventilation of the battery may be carried out by any suitable means not herein necessary to show.

Each separator group 5 comprises a microporous rubber sheet 27 having vertical ribs 27' on one side thereof, a flat perforated rubber sheet 28 adjacent the ribbed side of the microporous sheet, and a flat glass wool sheet 29 adjacent the perforated sheet. These separator groups are disposed in the assembly 2 so that the microporous rubber sheets are backed by the corresponding negative plates 4 and the glass wool sheets by the corresponding positive plates 3. In this assembly, the perforated rubber sheet 28 and the glass wool sheet 29 terminate below the level of the rods 18 as at the line 30 of Figure 1. The perforated rubber sheet 28 is however provided integrally with an upwardly extending portion 28' which is made solid and increased in thickness, the increase in thickness being however preferably somewhat less than the thickness of the glass wool sheet in order that clamping pressure between the battery plates will be applied to the glass wool sheet to hold it in place. The microporous sheet 27 and the upper part 28' of the sheet 28 are extended above the rods 18 and above the top edges of the battery plates but not to the level of the straps 8 and 9 so as to permit ready fusing of the battery plates to the straps while the plates are in assembled relation, as will hereinafter appear. The sheets 27 and 28 are accordingly apertured to receive the rods 18 and be thus held in place by the rods. As an additional support for the glass wool sheets, there are provided vertical U-shaped members 31, made as of rubber, at the ends of the battery which embrace the vertical borders of the perforated and glass wool sheets and clamp the same to the positive plates, the legs of the clamping member 31 being disposed in the space between the perforated and microporous rubber sheets.

The terminal posts aforementioned are initially integrally provided with the shoulders 12 above mentioned and with a transverse bar 40 at the lower end thereof, there being reenforcing and heat-conducting fins or ribs 41 running from the posts to the shoulders 12 and bar 40. This bar is provided with shorter and longer sets of teeth 42 and 43 which extend from the sides of the bar in opposite directions normal to the axis of the post, as is shown in Figures 3 and 4. Within the post there is a copper insert 44 which extends down into the bar 40, this insert being provided to increase the current conductivity of the post. The spaces or recesses 45 between the teeth are adapted to receive the conducting lugs of the battery plates from the bottom of the terminal structure, the lugs having square notches or recesses 46 to receive the bar 40 as is shown in Figure 4. This interfitting of the terminal structure with the conducting lugs provides a large surface exposure between the plates and terminal structure to permit the same to be fused together into a strong joint. As so interfitted, the longer teeth 43 extend beyond the lugs of the plates and constitute the basis for the formation of the supporting projections 20 as will hereinafter appear. In order that the terminal structure may be readily cast and fused to the lugs of the plates progressively from the base of the teeth outwardly and upwardly, the teeth are both dovetailed and tapered so that their adjacent interior surfaces will flare outwardly in a lateral direction toward the ends of the teeth and in an upward direction toward the ends of the lugs when the plates and terminal structure are in assembled relation. Diametrically opposite notches 47 in the terminal posts at the bases of the adjacent teeth serve to expose these to permit them to be fused to the lugs of the conducting plates.

It will be seen that as many terminal structures are employed for each polarity as will provide facility for connection to the desired number of battery plates—there being employed four terminal structures for each polarity in the present instance. These terminal structures are fused to the battery plates while the plates and separators are held in assembled relation, the bars 40 of these structures being fused together end to end, and the spaces between the teeth and conducting lugs of the plates being filled with metal from a lead stick to form the solid straps 8 and 9' aforementioned. During fusing, the ends of the teeth 43 which overhang the lugs of the plates are formed into the projections 20 by the use of a suitable mold or fixture not shown, which fixture is preferably provided with a toothed part adapted to be extended between the plates of a completed plate and separator assembly 2 to support the terminal post positively at the proper height in relation to the assembly, it being understood that the use of such a toothed fixture is permitted by reason of the top edges of the separators being spaced below the terminal posts as is hereinbefore mentioned.

By the arrangement of the terminal structure and battery lugs abovedescribed, the copper insert 44 is permitted to extend down closely to the battery plates, as shown, to afford a low resistance connection between the battery plates and the terminal posts. Also, I provide fused joints between the posts and battery plates of large length—a length equal to the sum of that of a tooth 42 and tooth 43; yet the posts, by being centrally located with respect to these joints, are permitted to have a simple cylindrical shape and be yet spaced, as of those of one polarity from those of the other polarity, at distances which have become standardized in the submarine battery art.

The diffused conductive material in the electrolyte, which has been hereinbefore referred to, settles onto the battery plates and separators, particularly onto the horizontal top surfaces thereof, and in time builds up into a mossy-appearing deposit of a highly conductive nature which grows and branches out into what has become characteristically known in the art as "mossing" or "treeing." These sediment deposits will eventually bridge across from one battery plate to another and short-circuit the plates. This short-circuiting is prevented from occurring at the side edges of the plates by the insulating members 31. To prevent the short-circuiting from occurring at the bottom edges of the plates, which is a place where the sediment tends to collect and grow, the separator sheets are extended considerably below the battery plates as is shown in Figure 2. At the tops of the plates, where the short-circuiting tendency is greatest, the negative plate 4 is provided with a coating 4' of insulating material such as of a suitable rubber compound, and the separators 27 and 28 are extended above the battery plates as aforementioned. This coating is applied as by a spraying or dipping process and is provided from below the apertures 17, as from the line 30 of Figure 1, up over the lugs and ears of the battery plates. Before applying this coating, however, the top portions of the battery plate lugs, which are fitted between the teeth 42 and 43, are covered with a suitable removable material or tape such as Scotch masking tape. After the coating has been applied, it is then severed below the tape at the line 49 and the tape is then stripped off to provide a clean surface on the part of the lugs to be fused to the terminal structures.

I find that this coating is particularly vulnerable, as it is weak in structure and does not adhere well to the battery plates, and that as a result it is often broken and torn off in places during handling and assembling of the plates and during even the use of the battery as from settling of the battery plates and separators. In order that the coating 4' will not be unduly exposed to such possible damage, I reduce the portion of the plate to be coated at least to an extent equal to the thickness of the coating which is applied and thus preserve an even over-all thickness of the battery plate. Moreover, it will be seen that this reducing of the top portion of the plate where the coating is applied has the additional important advantage of avoiding any undue separation of the battery plates and thus of preserving a compact plate and separator assembly to enable an efficient use of the internal space of the battery.

The coating of the negative plates with the insulating material as is above described has served effectively to prevent short-circuiting of adjacent plates by sediment deposits bridging the tops of the plates. In batteries which employ rigidifying cross rods beneath the level of the electrolyte as is above described, there are additional horizontal surfaces provided by these rigidifying rods on which the sediment settles. This settling of the sediment on these rods, I find, leads to an additional source of short-circuiting of the plates which the rubber coating 4' as has been provided is ineffective to overcome. This is because the coating 4' within the apertures 17 and at the edges of the apertures is often broken and stripped off from the plates by the assembling of the rods 18 leaving the plates there exposed. As a result sediment deposits on the rods 18, as between the microporous and perforated sheets, grow out through the apertures in the separators and come into contact with the plates to short-circuit the same. To prevent the occurrence of such a short-circuiting, I enlarge the aperture 17 in each positive plate, provide recesses 32 in the side walls of the plate about the apertures and fit the apertures and recesses with a strong insulating grommet 33 made suitably of rubber. This prevents the sediment deposits from contacting the positive plate except by the sediment building up over the flanges of the grommet, which can however be prevented by the choice of the dimensions of these flanges. This and similar subject matter is not claimed herein as the same is claimed in my pending continuation in part application abovementioned.

Alternative to the arrangement just described for preventing short-circuiting of the plates at the rods, I provide the recesses 32 in the walls of the positive plate about the aperture 17 without enlarging the apertures 17, and then merely insert insulating washers 34 in these recesses 32 (see Figure 8). These washers are however press fitted onto the rigidifying rods to form a tight seal therewith, which is not necessary when grommets are used as these may be loose on the rods.

In battery arrangements where the separators are extended above the battery plates to give added protection against short-circuiting from mossing or treeing, there is encountered a servicing difficulty that the electrolyte cannot be reached to be tested when it is below the separators even though it is yet considerably above the battery plates. To alleviate this difficulty, I find it advantageous to reduce the height of the separators above the battery plates at the place directly below the filler opening 24, this reduction being made by cutting away the separators at 35 as is shown in Figure 2. The provision of this cutaway does however not substantially increase the mossing or treeing tendency as here the battery plates are substantially farther below the separators than at the other places.

It is seen that the battery herein shown and described is rendered more reliable, durable and efficient by my invention. I do not however intend to be limited to the particular embodiments herein shown and described, as the same are subject to many changes and modifications without departure from the scope of my invention, which I endeavor to express according to the following claim.

I claim:

In combination, a set of battery plates having recessed conducting lugs, and a terminal structure adapted to be fused to the lugs of said plates and comprising a terminal post having a transverse connecting bar secured thereto at one end thereof, said bar having teeth projecting laterally from the opposite sides thereof, said toothed bar and lugs being adapted to interfit in an assembled relationship wherein portions of said lugs at the sides of the recesses thereof are interposed between adjacent teeth of the bar and the bar extends into said recesses.

GEO. N. PROCTOR.